April 16, 1963

F. O. E. SCHULTZ 3,085,833

BRAKE CONTROL FOR DISCONNECTED TRAILERS

Filed Nov. 4, 1957

INVENTOR.
FORREST O. E. SCHULTZ

BY *Irvin L. Groh*

ATTORNEY.

United States Patent Office 3,085,833
Patented Apr. 16, 1963

3,085,833
BRAKE CONTROL FOR DISCONNECTED TRAILERS
Forrest O. E. Schultz, Owosso, Mich., assignor to Midland-Ross Corporation, a corporation of Ohio
Filed Nov. 4, 1957, Ser. No. 694,299
6 Claims. (Cl. 303—29)

This invention relates to trailer brakes and more particularly to means for actuating trailer brakes after the trailer has been disconnected from its tractor or towing vehicle.

Present trucking practices are such that it is often desirable to position a trailer at a given location for loading and to disconnect the tractor for operation with another loaded trailer. After the first trailer is partially loaded, it may be desirable to move it to one or more additional loading positions and eventually to a parked position to await connection to a tractor for highway operation. Many trailers are equipped with air brake systems in which the trailer brakes are applied and held in applied condition when the tractor is disconnected from the trailer. Under such conditions, maneuvering of a disconnected trailer is inconvenient since the brakes must be released. This necessitates reconnecting the trailer to a tractor equipped with the same type of brakes or if the proper type of tractor is not available, the air must be completely exhausted from the trailer system. In the event that all of the air is exhausted from the system, any type of towing vehicle may be used to relocate the trailer but in its new location the brakes can not be applied. Furthermore, when the trailer is reconnected to a tractor for highway operation, a waiting period is required before the air compressor on the tractor can restore the required air to the trailer brake system.

It is the general object of the invention to provide a trailer brake system in which the brakes may be readily applied and released even though the trailer is disconnected from the tractor.

A further object of the invention is to provide a trailer brake system in which the brakes of a disconnected trailer may be applied and released and in which the brakes will be maintained in either applied or released condition.

It is another object of the invention to provide a simple control means for applying and releasing the brakes of a disconnected trailer which may be easily installed in existing tractor brake systems.

More specifically, it is an object of the invention to provide a trailer brake system which utilizes the air trapped in the system to apply and release the brakes after the trailer is disconnected from its tractor and one in which the control mechanism is made inoperative when the tractor and trailer are connected together so that there is no interference with normal tractor-trailer brake application.

Still another object of the invention is to provide a trailer brake system in which the brakes of a disconnected trailer may be operated by using the air remaining in the trailer system and in which the brakes may be maintained in either applied or released condition until the pressure of the air drops below a predetermined minimum, at which time the operator is warned that the supply of air is dangerously low and the brakes must be maintained in released position manually.

The foregoing and other objects and advantages are attained by the present invention, various novel features of which will be apparent from the following description and from the accompanying drawings disclosing a preferred embodiment of the invention.

Referring to the drawings.

Figure 1:
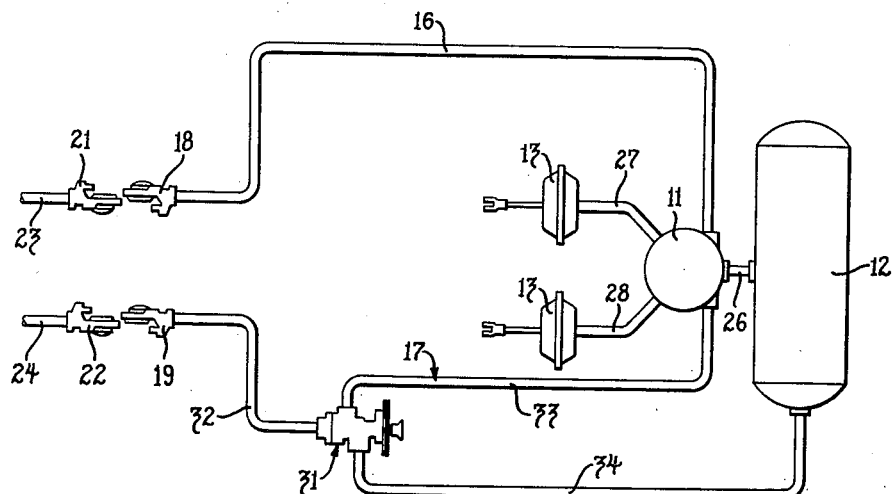
FIG. 1 is a diagrammatic view of the components of a trailer brake system embodying the invention.

Referring to FIG. 1 a preferred embodiment of the invention is illustrated in connection with a conventional trailer brake system which includes an emergency relay valve 11, an air reservoir 12 and a plurality of brake chambers 13 all of which are mounted on the trailer. The emergency relay valve is connected with the tractor brake system (not shown) by a trailer service line 16 and a trailer emergency line 17 which are provided with couplers 18 and 19 for detachable connection to complementary connectors 21 and 22 of a service line 23 and an emergency line 24 leading from the tractor. When the trailer brakes are to be applied, a control valve on the tractor is actuated to supply air through the service lines 23 and 16 to the emergency relay valve 11. This is effective to actuate the relay valve to permit delivery of air under pressure from the reservoir 12 through a line 26, emergency relay valve 11 and lines 27 and 28 to chambers 13 which apply the brakes. To release the brakes the control valve on the tractor is operated to empty air from the service line 16 to the atmosphere. This actuates the emergency relay valve and causes air to exhaust from the chambers 13 through the emergency relay valve 11 in a well known manner. An emergency application of the trailer brakes occurs when emergency line 17 is disconnected from the emergency line 24 to vent line 17 to the atmosphere. When this occurs, the emergency relay valve automatically connects reservoir 12 with the chambers 13 through conduit 26, emergency relay valve 11 and lines 27 and 28 to apply the brakes. The brakes remain applied until the trailer is reconnected to the tractor and emergency line 17 is connected to emergency line 24 to re-establish pressure in the emergency relay valve so that the brakes will release. Since all of the components mentioned thus far are conventional and are well known in the art, they will not be described in greater detail.

From the above it will be apparent that when the trailer is disconnected from the tractor, the trailer brakes are applied and are held in an applied condition. If it is desired to reposition the trailer at a loading dock, the brakes must be released and this can be accomplished only by reconnecting emergency line 17 with an emergency line 24 on a tractor or by completely draining air from the entire trailer system, that is, the reservoir 12, lines 26, 27 and 28, relay valve 11 and chambers 13. One of the main advantages of the present invention is that the trailer brakes may be applied and released without connecting the trailer to the tractor and without bleeding all of the air from the trailer system.

In the present trailer brake system, the usual braking system is combined with control means in the form of a valve mechanism 31 disposed between lines 32 and 33 which act as a single line in conventional brake systems to form an emergency line indicated generally at 17. Another line 34 is connected at one end to the valve mechanism and at the other end to a source of air under pressure such as the reservoir 12.

Figure 2:
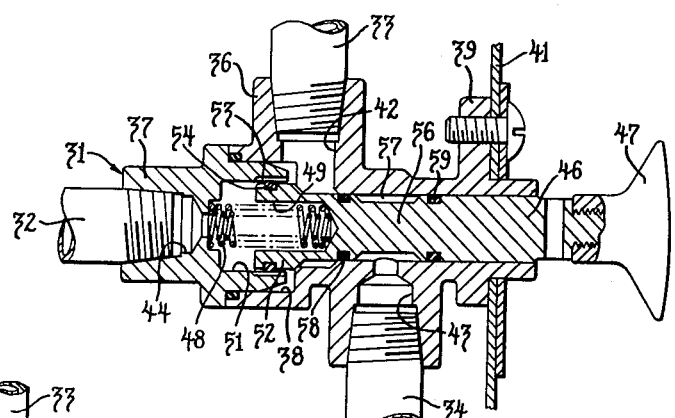
FIG. 2 is an enlarged cross-sectional view of a control valve shown in FIG. 1 and illustrating a condition which exists when the trailer is connected to a tractor.

As best seen in FIG. 2, the valve mechanism 31 includes a housing comprising a body member 36 and a cap 37 held securely in one end of a stepped bore 38 formed in the body member. The body member is provided with a flanged portion 39 by which the valve mechanism may be bolted to a portion 41 of a trailer in position for easy access. A pair of axially extending ports 42 and 43 are formed in the body member 36 to communicate with the bore 38 and are connected to air conveying lines 33 and 34, respectively, a third port 44 is formed in the cap 37 to communicate with one end of the bore 38 and is adapted to receive one end of the line 32 leading from the tractor emengency line 24.

A valve element or actuator 46 is supported in the bore for sliding movement between the positions controlling the flow of air under pressure through lines 32, 33 and 34. One end of the actuator 46 projects from the end of the housing and is fitted with a knob 47 by which the actuator may be moved axially in the bore between positions illustrated in FIGS. 2 and 3. A spring 48 is biased between a seat formed by the end of a bore 49 in the actuator and a seat in the end of a bore 51 in the cap 37 to urge the actuator to a position shown in FIG. 2.

Bore 51 in cap 37 is adapted to receive an enlarged end 52 of the actuator 46. The inner annular portion of the bore 51 is provided with axially extending flutes 53 adapted to engage an O ring seal 54 seated in the enlarged end 52 of the valve actuator. The flutes 53 coact with the O ring 54 to maintain the enlarged end 52 is alignment with the bore 51 and to permit air flow between port 44 and the port 42 when the actuator 46 is positioned as shown in FIG. 2. The actuator 46 is also provided with a portion 56 having a reduced diameter which in the position shown in the FIG. 2 acts with the walls of stepped bore 38 to form a chamber 57. When the actuator 46 is postioned as shown in FIG. 2, the chamber 57 communicates with the port 43 and the line 34 and leakage of air is prevented by a pair of seals 58 and 59 seated at opposite sides of the chamber 57.

In operation, with the trailer connected to its towing tractor and with the valve actuator 46 positioned as shown in FIG. 2, air under pressure is free to flow from the tractor emergency line 24, through line 32, around seal 54 by way of the flutes 53, through port 42 and line 33 to the emergency relay valve 11. Air supplied to the emergency relay valve in this manner is transferred to the trailer reservoir 12 and is the usual means by which air is supplied from the compressor on the tractor to the air reservoir on the trailer. The actuator 46 will be held in this position so that the tractor-trailer brakes may be applied in the conventional manner. The force holding the actuator 46 is a result of the sum of force produced by spring 48 and the pressure of air flowing through lines 32 and 33 and acting against the left side of seal 58. Since the pressures at opposite sides of the O ring 54 are equal and since the pressure in chamber 57 acts in opposite directions against seals 58 and 59, the pressure at the left side of seal 58 acts against the atmosphere pressure acting at the right side of seal 59. The force produced by this pressure, together with the force of the spring, is effective to bias the actuator 46 to the right and maintain it in the position shown in FIG. 2.

When the trailer is disconnected from the tractor, couplers 19 and 22 will be disconnected to cause exhaust of air from line 32 and also from the line 33 by way of the valve ports 42 and 44. This will be effective to actuate the emergency relay valve 11 in the usual manner so that the chambers 13 are supplied with air to maintain the brakes in applied condition.

Figure 3:
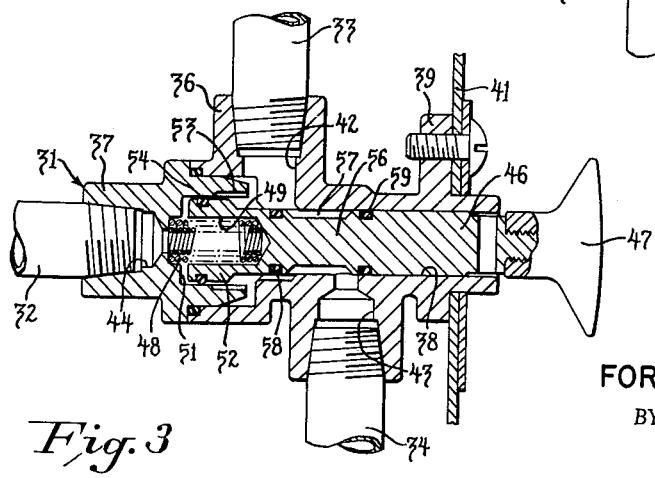
FIG. 3 is a view similar to FIG. 2 showing another position of operation when the trailer is disconnected from the tractor and the brakes are released.

Referring now to FIG. 3, with the trailer disconnected from the tractor, the brakes may be released by moving the actuator 46 to the position illustrated, that is, to the left so that the enlarged end 52 of the actuator 46 enters the bore 51. In this condition the O ring seal 54 moves relative to flutes 53 and closes the port 44 to the passage of air. At the same time the chamber 57 remains in communication with port 43 and moves axially of the bore 38 into communication with the port 42. In this condition of the valve, air under pressure is supplied from the reservoir 12 through the line 34, port 43, chamber 57, port 42 and emergency line 33 to actuate the emergency relay valve 11. As in conventional brake systems a supply of air in the emergency line is effective to actuate the emergency relay valve to release the trailer brakes and to maintain them in a released condition. Under these conditions the valve actuator 46 will be maintained in the position shown in FIG. 3 by air pressure acting against the various seals to overcome the force of the spring 48. The pressure acting on seal 58 will have no effect since it is equal at opposite sides. However, the pressure at the right side of seal 59 is atmospheric and at the left is equal to that of the reservoir. In like manner, the pressure at the right of seal 54 is equal to the pressure in the reservoir 12 and at the left is equal to the atmosphere. The net result of this is that reservoir pressure acts in opposite directions against seals 54 and 59. Since seal 54 has a larger effective diameter than seal 59, the force on seal 54 will be the greater and will be effective to urge the actuator 46 to the left in opposition to the force created by spring 48. With the actuator maintained in this position, the trailer brakes will remain released so that the trailer may be moved.

After the trailer has been moved, the brakes may be applied to hold the trailer in its new location by manually moving the valve to the right from the position shown in FIG. 3 to the position shown in FIG. 2. This will be effective to exhaust air from the line 32 and 33 to the atmosphere so that the emergency relay valve 11 will be actuated to apply the brakes.

The brakes of the trailer may be applied and released as many times as desired until the supply of air in the tank 12 is reduced to a predetermined minimum, at which time the actuator 46 will return automatically to the position shown in FIG. 2 when the knob 47 is released. Under these conditions, the brakes will be applied. This serves as a notice to the operator that only a small amount of air pressure remains and that only a limited number of additional brake releases may be made. This is accomplished by selecting a spring 48 with a predetermined value large enough to overcome the pressure acting at the left of seal 54 when that pressure drops to the predetermined minimum. When the pressure drops below the minimum, the spring will be effective to return the valve to the FIG. 2 position.

Any further actuation of the relay valve 11 can be accomplished manually, that is, when the actuator 46 is moved to the position shown in FIG. 3 and the knob 47 is released by the operator, the actuator 46 will immediately be returned by the spring 48 to the position shown in FIG. 2. Consequently, to release the brakes and maintain them in the released condition, the operator must hold the valve against the action of spring 48. This would be an awkward operation to accomplish during movement of the trailer. However, it is believed to be of greater importance to have the trailer brakes applied than it is to permit the entire supply of air in the reservoir 12 to be utilized for applying and releasing brakes.

After the trailer is loaded and is recoupled to the tractor, air under pressure will be supplied from the tractor through line 24, connectors 22 and 19 to line 32. If the actuator is positioned to apply the brakes as seen in FIG. 2, air will be supplied to line 33 and the relay valve 11 to supply air to reservoir 12 in the usual manner. However, if the actuator 46 is positioned as shown in FIG. 3, that is, in a position to release the trailer brakes, a supply of air from the tractor through lines 24 and 32 will cause the actuator 46 to move to the right toward the position illustrated in FIG. 2. As previously described, air under pressure from the reservoir 12 flowing through line 34 to line 33 is effective at the right side of seal 54 to overcome the force of spring 48 to maintain the actuator in its brake releasing position. When air under pressure enters line 32, it is effective at the left side of seal 54 to overcome the pressure at the right side of the seal. This permits spring 48 to return the actuator 46 to the position shown in FIG. 2. Under such conditions, the brakes on both the tractor and the trailer may be operated in the usual manner without any adverse affect by the control valve 31 or the line 34. Furthermore, if an operator neglects to return the valve actuator 46 to its usual position (FIG. 2), it will return automatically when the trailer is connected to the tractor and lines 24 and 32 are joined together.

It will now be apparent that there has been provided control means by which existing trailer brake systems may be modified so that the trailer brakes may be released to permit maneuvering of the trailer for loading and by which the brakes may be reapplied when the trailer is relocated at its new position. Furthermore, the arrangement is such that the supply of air existing on the trailer when the latter is disconnected from the tractor is available for numerous brake applications until the pressure decreases to a predetermined minimum, at which time additional applications of the brakes to release them and maintain them released requires continual manual effort.

It should be understood that it is not intended to limit the invention to the above described forms and details, and that the invention includes such other forms and modifications as are embraced by the scope of the appended claims.

It is claimed and desired to secure by Letters Patent:

1. In a trailer brake system having a reservoir containing air under pressure and an emergency relay valve operable to apply brakes on said trailer in response to a controlled supply of air under pressure in a service line when the trailer is connected to a tractor and to a loss of air pressure in an emergency line when the trailer is disconnected from the tractor, the combination of a control mechanism including a body member disposed in said emergency line to permit air flow therethrough, an auxiliary line communicating with said body member and said reservoir, valve means supported in said body member and being movable from a first position in which said emergency relay valve is in communication with the atmosphere through said emergency line to apply the trailer brakes when the tractor is disconnected from said trailer to a second position in which said auxiliary line is in communication with said emergency relay valve to supply air under pressure and release said brakes, and means for selectively and manually moving said valve means to one or the other of said positions, said valve means being movable from said second position to said first position automatically in response to a supply of air under pressure in said emergency line when the trailer is connected to said tractor.

2. In a trailer brake system having brake applying motors a source of air under pressure, and an emergency relay valve responsive to a supply of air to permit air to exhaust from said brake motors to release the brakes on said trailer and responsive when air is exhausted from said emergency relay valve to permit air to be supplied from said source to said motors for applying the brakes on said trailer, control means for releasing and applying said trailer brakes when said trailer is disconnected from its towing tractor comprising valve means having a body member communicating through first, second and third ports with said emergency relay valve, the atmosphere and said source, respectively, an actuator element supported in said housing for movement between a brake applying position in which said first and second ports are in communication with each other and a brake releasing position in which said first and third ports are in communication with each other, spring means normally biasing said actuator to said brake applying position, means for manually moving said actuator against the bias of said spring to said brake releasing position, and means on said actuator and disposed between said first and third ports when said actuator is in said brake releasing position and being responsive to air pressure from said source to maintain said actuator in said brake releasing position.

3. In a trailer brake system having an emergency relay valve normally connected through an emergency line to a source of pressure on a tractor to supply air under pressure to an air reservoir on the trailer and being responsive when said emergency line is disconnected from said tractor to actuate said emergency relay valve to apply brakes on said trailer, the combination of a valve body having first, second and third ports connected to said emergency relay valve, said emergency line and said trailer reservoir, respectively, an actuator disposed in said body member and being movable to control the flow of air through said ports, said actuator having one position in which said first and second ports are connected together to permit air flow from said tractor to said reservoir when said tractor is connected to said trailer and to actuate said emergency relay valve to apply the trailer brakes when said trailer is disconnected from the tractor, said actuator having a second position in which said first and third ports are connected together to admit air from said trailer reservoir to said emergency relay valve to actuate the latter for releasing the trailer brakes when the trailer is disconnected from the tractor, spring means operative to continuously urge said actuator to said one position, means for manually moving said actuator between said first and second positions, and seal means associated with said actuator and operative in response to a supply of air under pressure from said trailer reservoir to maintain said actuator in said second position against the resistance of said spring, said seal means being responsive to a supply of air under pressure from said emergency line when said trailer is connected to said tractor to overcome the pressure of the air from said trailer reservoir to permit said spring to bias said actuator to said first position.

4. For use with a trailer air brake system having a source of air under pressure connected to an emergency relay valve and an emergency line operative when connected to a tractor to supply air to said source through said emergency relay valve and operative when disconnected from said tractor to communicate with the atmosphere to apply said brakes, control means for applying and releasing said brakes when said trailer is disconnected from the tractor comprising a body member having first and second ports adapted for connection to said emergency line and the atmosphere, respectively, and a third port for receiving a source of air under pressure, valve means disposed in said housing and being selectively positionable in a first location placing said first and second ports in communication with each other to apply said brakes and in a second location placing said first and third ports in communication with each other to release said brakes, and means operatively associated with said valve means and being responsive to pressure of air from said source when said valve means is moved to said second location to retain said valve means in said second location.

5. For use with a trailer brake system having air actuated brakes and a source of air under pressure connected to an emergency relay valve and an emergency line operative when connected to a tractor to supply air to said source through said emergency relay valve and operative when disconnected from said tractor to communicate with the atmosphere to apply said brakes, means for applying and releasing said brakes when said trailer is disconnected from said tractor comprising a body member interposed in said emergency line and having first and second ports connected thereto, said body member presenting a third port connected to said source of air under pressure, valve means disposed in said housing and being selectively positionable in a first location placing said first and second ports in communication with each other to admit atmospheric air through said emergency line to apply said brakes and in a second location closing said second port and placing said first and third ports in communication with each other to admit air from said source to said emergency relay valve to release said brakes, spring means continuously in engagement with said valve means and normally urging the latter to said first location, manual control means for moving said valve means to said second location in opposition to said spring means, and a pressure responsive element on said valve means having one side exposed to pressure at said second port and the other side exposed to pressure at said first and third ports, said pressure responsive element being operative to maintain said valve means in said second location when the pressure in said source is sufficient to overcome said spring means.

6. A valve structure having a valve body including first, second and third ports, a valve member disposed in said body and being movable between a first position maintaining said first and second ports in communication with each other and isolating said third port therefrom and to a second position placing said first and third ports in communication with each other and isolating said second port therefrom, spring means normally urging said valve member to said first position, manual means for moving said valve member to said second position in opposition to said spring, and a pressure responsive portion formed on said valve member having opposite sides exposed to pressures at said second and third ports when said valve member is in said second position, said valve portion being responsive to the pressure at said third port to maintain said valve member in said second position in opposition to said spring means and responsive to an increase in pressure at said second port to return said valve member to said first position, said manual means being operative to move said valve member from said second position to said first position.

References Cited in the file of this patent

UNITED STATES PATENTS

| | | |
|---|---|---|
| 828,086 | Bowers | Aug. 7, 1906 |
| 2,084,707 | Robinson | June 22, 1937 |
| 2,633,324 | Bierman | Mar. 31, 1953 |
| 2,782,801 | Ludwig | Feb. 26, 1957 |

FOREIGN PATENTS

| | | |
|---|---|---|
| 331,787 | Italy | Nov. 15, 1935 |